Jan. 22, 1929.  R. A. SMITH  1,700,102
BUSHED FLEXIBLE COUPLING
Original Filed Sept. 18, 1925
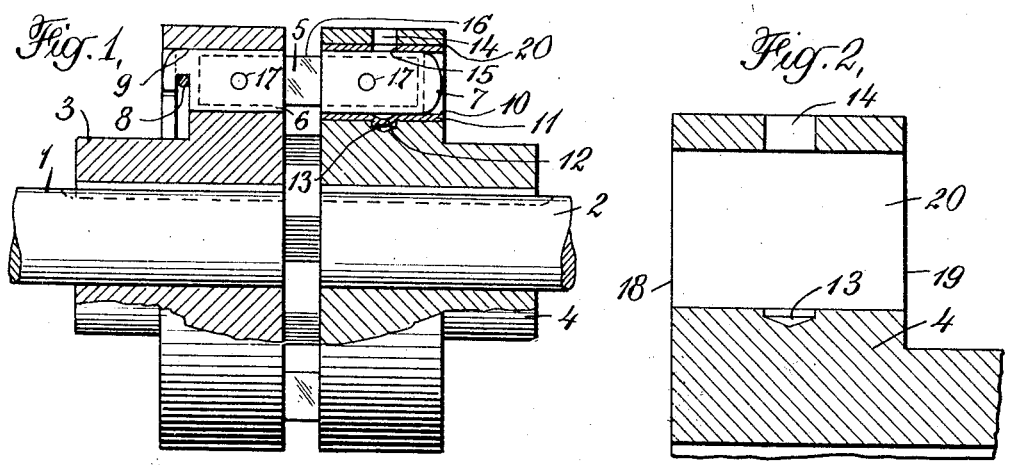
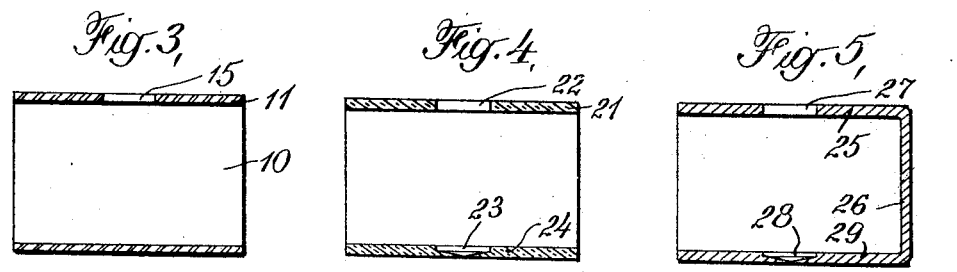
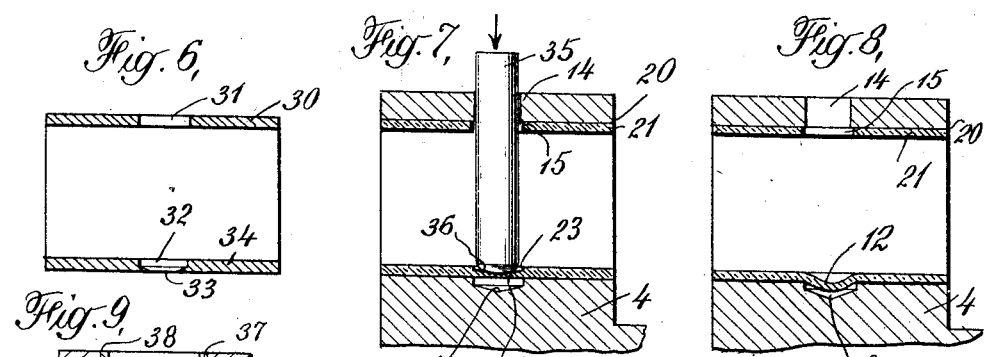
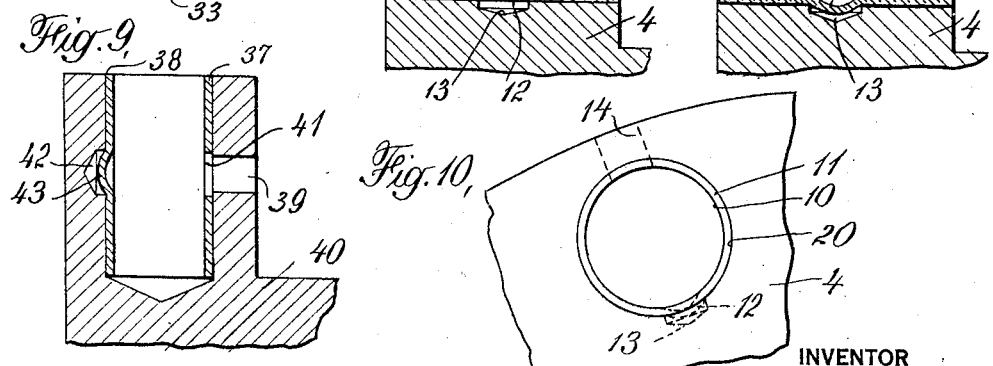
INVENTOR
Robert A. Smith Patented Jan. 22, 1929.

1,700,102

UNITED STATES PATENT OFFICE.

ROBERT A. SMITH, OF MAHWAH, NEW JERSEY, ASSIGNOR TO SMITH & SERRELL, A COPARTNERSHIP CONSISTING OF JOHN J. SERRELL AND HIMSELF, OF ELIZABETH, NEW JERSEY.

BUSHED FLEXIBLE COUPLING.

Application filed September 18, 1925, Serial No. 57,088. Renewed June 16, 1928.

This invention relates especially to bushings for flexible couplings and other devices wherein it is desirable to bush an aperture or hole in the flexible coupling or other part with a bushing which can be easily and cheaply made and applied and removed when necessary. The flexible coupling may be of the usual type wherein two rotary members or flanges are connected to shafts for transmitting torque and motion between the shafts, and the connecting members between flanges may be any one of a number of connecting elements as for example, rigid steel pins or bolts fastened to one flange and projecting into recesses in the other flange, said recesses being filled with rubber or leather, the recesses being lined outside the rubber or leather with bushings fastened as hereinafter described, or a floating element may be between the flanges, each flange being connected flexibly to the floating element, or the connecting elements may be one of the many types of flexible laminated steel pins for example, as shown in my Patent 1,165,551 of December 28, 1915, or in my joint patents with Serrell 1,403,271 and 1,403,272. In this application the connecting members will be shown for convenience as the laminated steel pin connectors such as these last three patents mentioned. The use of bushings for these purposes for bushing holes is of course not new, but my method of constructing and fastening the bushing is simpler and less expensive where a bushing is desired, and will eliminate some careful or expensive machine work which I propose to avoid. While bushings are usually of a round form, the construction and process applies equally well, when desired, to any other shape of bushing. The hole in the coupling into which it is desired to insert and fasten a bushing has another smaller intersecting hole drilled approximately at right angles to the axis of the hole to be bushed. On the outer side this smaller intersecting hole extends to the exterior of the coupling and on the inner side of the hole to be bushed the smaller intersecting hole extends only a small way into the metal of the coupling part. The bushing is made with a matching hole of approximately the same diameter as the outer portion of the small intersecting hole. Depending on the thickness of the bushing it may have a drilled portion or hole part way or completely through the diametrically opposite portion of the bushing which will match up with the inner portion of the intersecting hole in the coupling flange member. In this way when the bushing is inserted in the hole in the coupling flange the intersecting holes in the bushing match up with the intersecting holes in the flange and by inserting a punch, which, when necessary, need be nothing more than a bolt or other rod, through the two outer matching intersecting holes against the metal of the diametrically opposite wall of the bushing this metal of the diametrically opposite wall may be driven into the end of the intersecting hole in the coupling flange and thus the bushing is located securely in the coupling flange. When it is desired to renew the bushing, this driven in portion of bushing metal may be easily removed as by inserting a drill through the same two outer matching intersecting holes against the driven in metal of the diametrically opposite wall and drilling out the metal so that the bushing is once again free to slide endwise. A new bushing may be easily inserted in the same manner as at first and it will be seen that this work is easily done without any special tools in the field and also that it is not necessary to have expensive press fits or collars or screws.

In the accompanying drawing showing in a somewhat diagrammatic way a number of illustrative embodiments of this invention—

Fig. 1 is a longitudinal part section through a flexible coupling showing the flexible connecting members and the bushing in place.

Fig. 2 is an enlarged sectional view of part of the coupling flange from the right hand end of Fig. 1 showing the part of the flange before the bushing is applied.

Fig. 3 is a sectional view of a bushing such as is used to bush the hole in the flange in Figs. 1 and 2.

Figs. 4, 5 and 6 show somewhat different style bushings.

Fig. 7 shows the flange as in Fig. 2 with a bushing inserted in place and ready to punch the metal of the bushing into the end of the intersecting hole in the flange.

Fig. 8 shows the bushing in place in the hole in the flange after the punch is removed.

Fig. 9 is a sectional view showing a radial bushing.

Fig. 10 is an end view in part of a flange and bushing.

As shown in Fig. 1 the shaft 1 may, if desired, be connected to shaft 2 through a flexible coupling made up of flanges 3 and 4 keyed to the shafts 1 and 2 in the usual manner. The flanges 3 and 4 may be connected by a number of flexible connecting pins 5 which have as their ends pin keepers 6 and 7. The keeper may be detachably fastened in flange 3 by spring retaining ring 8, and keeper 6 when desirable is therefore practically fastened without motion in pin hole 9. In the flexible connecting pins 5 as used in connection with a bushed pin coupling the connecting springs 16 are, if desired, connected substantially without slide by the cross pins 17—17 to the keepers 6 and 7. Keeper 7 is therefore slidably held in pin hole 10 on the inside of bushing 11, and bushing 11 may, if desired, be tightly fixed in the hole 20 in flange 4 by means of the punched in metal 12 of the bushing 11 in the intersecting hole end 13 of intersecting hole 14 of the flange which matches up approximately with intersecting hole 15 of the bushing 11.

As shown in Fig. 2, flange 4 may be made with faces 18 and 19 substantially parallel and smooth in a plane perpendicular to the axis. Hole 20 is one of a circumferential series which may, if desired, be drilled and reamed parallel to the axis of flange 4, so that the series of holes 20 provide openings for the connecting pins 5 of Fig. 1 in the usual manner. Through each of the holes 20, which may be bushed when desired, is drilled or otherwise provided an intersecting hole 14 which in this case is shown substantially in radial position, so that the inner end 13 of the intersecting hole 14 is diametrically opposite the entrance of intersecting hole 14 in hole 20. It will be seen that the flange therefore is provided with an intersecting hole 14 whereby the end 13 of the intersecting hole can be reached either with a drill or punch as desired.

Fig. 3 shows one form of bushing 11 which may be used in the coupling flange 4 shown in Fig. 1. This bushing 11 may be of any preferred material, usually of one piece, as for example, steel, brass, bronze, graphited metal, fibre, leather, etc. The pin hole 10 within the bushing 11 is made to the desired fit on the connecting pin, so that the pin will be free to slide within the pin hole 10. The intersecting hole 15 as shown in this case is drilled through one side only of the bushing and the position of this intersecting hole 15 is made to approximately match up with the corresponding intersecting hole 14 of the flange as in Figs. 1 and 2. For convenience the intersecting hole 15 in bushing 11 may be made of the same size as the corresponding intersecting hole 14 in the flange of Fig. 2. In some cases it may be desirable to have the intersecting hole 15 either slightly larger or smaller to serve as a guide for the punch or drill, and an important feature is to have the intersecting holes 15 of the bushing and 14 of the flange in Fig. 2 match up reasonably well in location so that the punch or drill can be inserted. The outside diameter of bushing 11 may be made of any desired tightness of fit in the corresponding hole 20 in the flange in which the bushing is inserted.

Fig. 4 shows another form of bushing 21 differing from the one shown in Fig. 3 by having the intersecting hole 22 extend across the bushing approximately diametrically opposite its entrance to have its end 23 partially through the wall 24 of the bushing 21.

Fig. 5 shows another form of bushing 25, preferably of one piece metal, differing from the one shown in Fig. 4 by having an end 26 closed as by deep drawing, and it also has the intersecting hole 27 extended across the bushing diametrically opposite its entrance to have its end 28 partially through the wall 29 of the bushing 25.

Fig. 6 shows a bushing 30 which may be otherwise similar to any of those described in the previous figures except that it has the intersecting hole 31 carried a little further across the bushing 30 so that the end 32 of the intersecting hole 31 projects slightly through the wall 34 of the bushing 30 to leave an opening 33. Where a bushing is made with a very thick wall, this varying degree of penetration of the wall by the end of the intersecting hole makes it possible to drive out the metal of the wall to form a locking device, such as an integral locking projection on the bushing, without too great a pressure or blow.

Fig. 7 shows a part section of the coupling flange 4 with a bushing inserted, the bushing in this case being similar to bushing 21 of Fig. 4. This bushing 21 can be pushed or tapped to whatever degree of tightness is desired into the hole 20 in the flange. Unless special tightness is desired the bushing 21 need be only a nice slip fit in hole 20. When in place with the intersecting hole 15 of the bushing approximately matching up with the intersecting hole 14 in the flange, and correspondingly the intersecting hole end 23 in the bushing matching up with intersecting hole end 13 in the flange, then a punch 35 is inserted by hand or machine operation as desired which punch 35 may have a square or round end 36 as desired to best punch the metal 12 of the bushing. With the punch in this position a pressure or a blow is applied to the punch 35 in the direction indicated by the arrow. After this is done, the punch may be withdrawn.

Fig. 8 shows a section of the flange 4 with the bushing 21 in place after the punch has been removed. The punched in metal 12 is punched in partly into the intersecting hole end 13 and thus it will be seen that a metal button or head of punched in metal prevents bushing 21 not only from turning but also from moving endwise in the hole 20. The punching in process can, if desired, be carried to such a degree that the hold will be very tight. With the bushing held in this manner with the intersecting hole and the punched in portion in approximately radial direction, there will be no direct wear of any amount on the punched in portion from the load pressure of the connecting pins, because the load pressure is tangential and approximately at right angles to the punched in metal button. While the bushing is thus held in a very firm manner, it may be very easily removed either in the factory or in the field by inserting through the intersecting holes 14 and 15 a drill approximately the same size as the punch and drilling out the punched in portion of the bushing which may be desired to be removed. The bushing will then be no longer held by the punched in portion 12 and the bushing may be taken out of the flange. When the old bushing is removed, the flange is then ready for the insertion of a new bushing just as at first.

All the previous figures have shown for convenience the pin holes in the flange parallel to the axis. Fig. 9 shows the adaptation of the same form of bushing 37 applied with the axis of the bushing in radial direction in a radial hole 38. The intersecting hole 39 in the flange 40 in this case is made approximately parallel to the axis, and the corresponding intersecting hole 41 in the bushing 37 is also parallel to the axis. The end 42 of the intersecting hole in the flange is filled in with the punched in metal 43 of the bushing wall as described for the other figures.

Fig. 10 shows an end view of part of flange 4 in Fig. 1 with the connecting flexible pin not in place. This end view shows how the bushing 11 is in place in circular pin hole 20 and the punched in metal 12 is projecting in to end 13 of the intersecting hole 14.

This invention has been described in connection with a number of illustrative embodiments, forms, proportions, sizes, materials, numbers and arrangements of parts and methods of manufacture and use, to the details of which disclosure the invention is, of course, not to be limited, since what is claimed as new and what is desired to be secured by Letters Patent, is set forth in the appended claims:

1. In a flexible coupling with flange members each having a number of holes parallel to the coupling axis, with the flanges connected by flexible laminated steel pin units with keepers inserted within said holes and said holes in one of the flanges bushed with renewable bushings, bushings having an intersecting hole approximately at right angles to the axis of the bushing, each of the bushed holes in said flange having an intersecting hole matching approximately with the intersecting hole of the corresponding bushing, and the bushing wall approximately opposite the entrance of the intersecting hole extended into the end of the matching intersecting hole in the flange to form an integral retaining portion, to firmly and renewably hold the bushing from coming out of the hole in the flange.

2. In a flexible coupling with flange members having a number of renewably bushed holes parallel to the coupling axis, with the flanges connected by flexible laminated steel pin units inserted within said holes, bushings having an intersecting hole at an angle to the axis of the bushing, each of the bushed holes in said flange having an intersecting hole matching approximately with the intersecting hole of the corresponding bushing, and the bushing wall approximately opposite the entrance of the intersecting hole swelled into the end of the matching intersecting hole in the flange to form an integral holding portion.

3. In a flexible coupling having rotatable members having a number of renewably bushed holes parallel to the coupling axis, with the members connected by flexible laminated steel pin units inserted within said holes, bushings having an intersecting hole at an angle to the axis of the bushing, each of the bushed holes in said member having an intersecting hole matching approximately with the intersecting hole of the corresponding bushing, and the bushing wall approximately opposite the entrance of the intersecting hole swelled into the end of the matching intersecting hole in the member to form an integral retaining portion, to firmly and renewably hold the bushing from coming out of the hole in the member.

4. In a flexible coupling with flange members having a number of renewably bushed holes parallel to the coupling axis, with means for flexibly connecting the flanges, bushings having an intersecting hole at an angle to the axis of the bushing, each of the bushed holes in said flange having an intersecting hole matching approximately with the intersecting hole of the corresponding bushing, and the bushing wall approximately opposite the entrance of the intersecting hole swelled into the end of the matching intersecting hole in the flange to form an integral retaining portion.

5. In a flexible coupling having rotatable members having a number of renewably bushed holes parallel to the coupling axis, with means for flexibly connecting the members, bushings having an intersecting hole at an angle to the axis of the bushing, each of the bushed holes in said member having an intersecting hole matching approximately with the intersecting hole of the corresponding bushing, and the bushing wall approximately opposite the entrance of the intersecting hole swelled into the end of the matching intersecting hole in the member to form an integral holding portion.

6. In a flexible coupling having rotatable members having a number of renewably bushed holes, with means for flexibly connecting the members, bushings having an intersecting hole at an angle to the axis of the bushing, each of the bushed holes in said member having an intersecting hole matching approximately with the intersecting hole of the corresponding bushing, and the bushing wall approximately opposite the entrance of the intersecting hole swelled into the end of the matching intersecting hole in the member to form an integral retaining portion.

7. In a flexible coupling having rotatable members having a number of renewably bushed holes, with means for flexibly connecting the members, bushings having an intersecting hole at an angle to the axis of the bushing, each of the bushed holes in said member having an intersecting hole matching approximately with the intersecting hole of the corresponding bushing and said bushings each having an integral swelled portion opposite the entrance of the intersecting hole.

8. In a flexible coupling having rotatable members with means for flexibly connecting the members, holes in the members bushed with bushings, said bushings having an intersecting hole at an angle to the axis of the bushing and said bushings each having an integral swelled portion opposite the entrance of the intersecting hole.

9. In a flexible coupling having rotatable members with means for flexibly connecting the members, holes in the members bushed with bushings, said holes having an intersecting hole at an angle to said hole in the member and said bushings each having an integral swelled portion opposite the entrance of the intersecting hole.

ROBERT A. SMITH.